United States Patent [19]

Sager

[11] Patent Number: 4,769,095

[45] Date of Patent: Sep. 6, 1988

[54] METHOD OF CLOSING AN OPEN ENDED THERMOPLASTIC BODY

[75] Inventor: Thomas B. Sager, Newtown, Conn.

[73] Assignee: Branson Ultrasonics Corporation, Danbury, Conn.

[21] Appl. No.: 108,419

[22] Filed: Oct. 13, 1987

[51] Int. Cl.⁴ .......................... B65B 7/28; B29C 65/08
[52] U.S. Cl. ......................................... 156/69; 53/488; 156/73.1; 156/267; 156/293; 156/580.2; 264/23
[58] Field of Search .............. 156/69, 73.1, 212, 267, 156/293, 580.1, 580.2; 264/23; 53/485, 488

[56] References Cited

U.S. PATENT DOCUMENTS

| | | | |
|---|---|---|---|
| 2,012,529 | 8/1935 | Eldredge | 53/488 |
| 3,701,699 | 10/1972 | Jackson | 156/69 |
| 3,773,205 | 11/1973 | Keeler et al. | 156/73.1 |
| 4,282,699 | 8/1981 | Embro, Jr. | 156/69 |
| 4,670,072 | 6/1987 | Pastor et al. | 156/73.1 |

*Primary Examiner*—Michael Wityshyn
*Attorney, Agent, or Firm*—E. B. Steinberg

[57] ABSTRACT

The method of closing an open ended thermoplastic body with a thermoplastic sheet material comprises the provision of a groove in the thermoplastic body and a protrusion disposed on the output surface of a horn adapted to be resonant at an ultrasonic frequency. The protrusion of the horn is dimensioned to enter the groove and force the sheet material into contact with surfaces forming the groove for achieving, when the horn is rendered resonant, a weld between the sheet material and the body, the weld being confined to the surfaces forming the groove.

9 Claims, 1 Drawing Sheet

4,769,095

METHOD OF CLOSING AN OPEN ENDED THERMOPLASTIC BODY

BRIEF SUMMMARY OF THE INVENTION

This invention relates to welding thermoplastic workpieces by means of ultrasonic energy and, more specifically, concerns a method of closing an open ended thermoplastic body with a relatively thin, flexible plastic sheet material using ultrasonic energy for effecting a welded closure.

The use of ultrasonic energy for welding thermoplastic workpieces to one another is well established. Ultrasonic energy has the advantage of convenience of use, cleanliness, absence of the need for consumables, high speed of operation, controllable flow of molten thermoplastic material, etc.

The present invention concerns the welding of a thin, flexible film material to a heavier, substantially rigid, body and, more specifically, addresses the problem where such a thin and flexible film material is to be welded to the end surface of an open ended workpiece, for instance a tubular shaped workpiece, for closing such opening.

The prior art would suggest the provision of so-called "energy directors" on the end surface of the heavier workpiece, but practice has shown that such energy directors damage and cut the thin film material and cause the creation and presence of undesired flash material on the welded workpiece.

The present invention solves the problem by providing a groove in the end surface of the open ended thermoplastic body and the use of a horn (also known as resonator, tool, mechanical amplifier, etc.) having at its output surface a protrusion dimensioned to enter the groove. When disposing the film material between the output surface of the horn and the end surface of the open ended body and providing suitable relative motion between the body and the horn, the protrusion of the horn is caused to enter the groove while forcing also the film material into the groove and when the horn is rendered resonant, responsive to the dissipation of ultrasonic energy, welding of the film material to the surfaces of the groove of the body is achieved.

The protrusion of the horn is dimensioned relative to the groove of the body to cause welding of the film material to the groove surfaces, both by shear action and compressive force action. Subsequent to the welding operation, excess film material is trimmed off from the body.

One of the principal objects of this invention is the provision of a new and improved method of welding workpieces by ultrasonic energy.

Another important object of this invention is the provision of a new and improved method of closing an open ended thermoplastic body with a relatively thin and flexible thermoplastic sheet material using ultrasonic energy.

Still another important object of this invention is the provision of a new and improved method for ultrasonically welding a thin, flexible thermoplastic sheet material ove an open ended, hollow thermoplastic body by providing the end surface of the body with a groove, using an ultrasonically active horn to enter the groove while the film material is confined between the horn and the body and welding the film material to the body in the groove, whereby to close the open end.

Still further and other important objects of this invention will be more clearly apparent from the following description when taken in conjunction with the accompanying drawings.

DETAILED DESCRIPTION OF THE INVENTION

Figure 1:
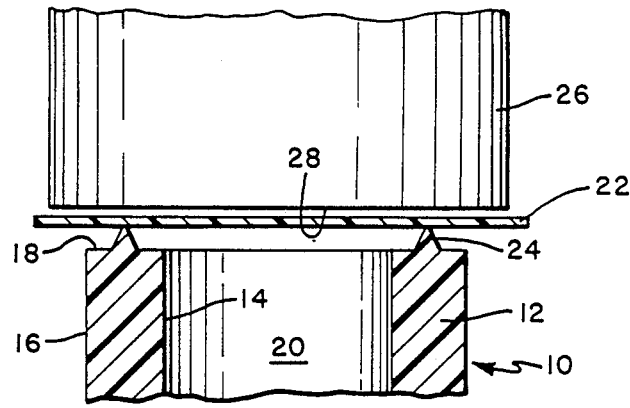
FIG. 1 is an elevational view, partly in cross-section, of a prior art arrangement.

Referring now to the figures and FIG. 1 in particular, there is shown an open ended thermoplastic hollow body 10 in the form of a cylindrical tubing 12 having an inside surface 14, and outside surface 16 and an end surface 18 defining the cavity 20 which is to be closed by welding to the end surface 18 a thin, flexible thermoplastic sheet material 22.

Prior art, see for instance "Ultrasonics in Packaging and Plastics Fabrication" (book) by Ralph H. Thomas, Sr., Cahners Books, Boston, MA 02110 (1974), LC No. 73-76443, pages 105-108, would suggest to provide the end surface 18 with an upstanding projection 24 known commonly in the art as "energy director". The energy director is the area where the thermoplastic material first softens and flows when ultrasonic energy is provided by a resonator or horn 26 which is dimensioned to operate as a half wavelength resonator in response to mechanical energy of predetermined frequency applied at an input surface of the horn and transmitted to an oppositely disposed output surface 28, see "Ultrasonic Engineering" (book) by Julian R. Frederick, John Wiley and Sons, New York, N.Y. (1965), pages 87-103.

For ultrasonic welding, the horn while energized, is in forced contact with body 10, specifically, the plane output surface 28 is caused by forced contact to transmit ultrasonic energy to the film material 22 superposed on the end surface 18 and its energy director 24.

Responsive to the dissipation of ultrasonic energy provided at the output surface 28 of the horn 26, the energy director 24 and the film material 22 at the area of forced contact soften and flow to provide molten thermoplastic material which upon the cessation of the application of ultrasonic energy, i.e. dwell time (the horn being retained in forced contact but no longer transmits ultrasonic energy), rigidifies to form a weld. This welding procedure is well known in the art.

The arrangement as described in FIG. 1 has several disadvantages. When the body 10 is made from relatively hard thermoplastic material, the energy director 24 tends to cut through the plastic film material 22. In addition, the flow of softened thermoplastic material is not well controlled and flash material may form at the inside surface 14, at the outside surface 16, or both of the tubular body 10. Cutting of the film material is not acceptable and in many applications the presence of visible flash material is equally not acceptable.

Figure 2:
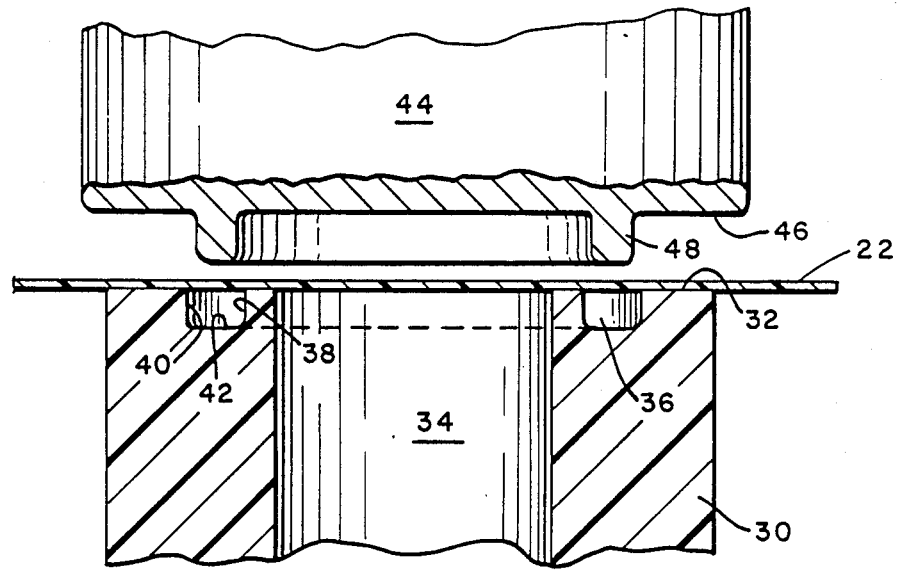
FIG. 2 is a view, similar to FIG. 1, showing the improved arrangement forming the present invention.

An improved arrangement forming the present invention is apparent from FIG. 2. The hollow body 30 has an end surface 32 for defining a cavity 34. The end surface 32 is provided with a "U"-shaped annular groove 36. By virtue of the "U"-shape, the groove 36 exhibits an inner side wall surface 38, an outer side wall surface 40 and a bottom surface 42.

The horn 44 is provided at its output surface 46 with a protrusion 48 which is dimensioned to enter the groove 36 of the body 30. Quite specifically, the protrusion 48 is dimensioned in a manner that when the film material 22 is superposed on the end surface 32 and, responsive to relative motion between the horn 44 and the body 30, the protrusion 48 is caused to enter the groove 36, the film material is slightly stretched over the opening 34 and forced into the groove 36 and brought, preferably, into intimate contact with the inner side wall surface 38, the outer side wall surface 40, and the bottom surface 42 of the groove.

Figure 3:
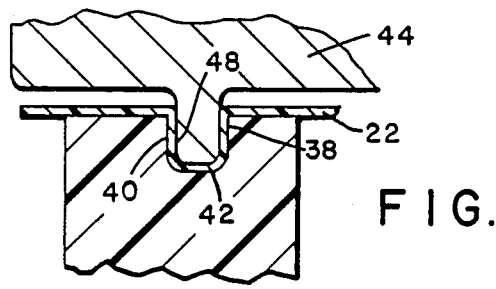
FIG. 3 is a cross-sectional view for illustrating the arrangement of parts during welding.

As a result of the dissipation of ultrasonic energy transmitted from the horn 44, the film material 22 will be welded to the side wall surfaces 38 and 40 by a shear welding action and to the bottom surface 42 of the groove by a compression force welding action, see FIG. 3. To this end, the height of the protrusion 48 is slightly greater than the depth of the groove 36.

For effecting a weld, the horn 44 is rendered resonant shortly before the protrusion 48 enters the groove 36 and the horn remains energized for a very brief time interval, a fraction of a second, while fully disposed in the groove. Thereafter, the horn and body are retained in interengagement for a brief dwell period while the horn no longer is active, during which time, the dwell time, the softened and melted thermoplastic material rigidifies to form a weld. Subsequently, the horn is withdrawn from the body 30 and excess film material disposed at the outside contours of the body 30 is trimmed off.

One of the advantages noted by using the improved arrangement is that there is no flash outside of the groove. Thus, the completed workpiece has a very clean and pleasing appearance.

At the present time, the preferred profile for the groove is a "U"-shape. Experiments with a "V"-shaped groove have not produced the same satisfactory joint between the body and the film material, quite possibly due to reduced shear force welding.

It will be apparent that the above method is applicable also when the body 30 is not of a circular configuration, for instance, it may have the shape of an oval, rectangle, square, etc.

In a typical example, the ultrasonic frequency used was 20 kHz, the body 30 was an extruded workpiece made from thermoplastic material PVDF "Kynar", approximately 3½ inch diameter with ¼ inch thick wall, and the film material was 0.010 inch thick and made from the same thermoplastic material. The protrusion 48 was 0.035" wide by 0.050" high. It will be apparent that these values are provided for illustrative purposes only and shall not be construed as limitations.

While there has been described and illustrated a preferred embodiment of the invention and several modifications have been indicated, it will be apparent to those skilled in the art that various further changes and modifications may be made without departing from the principle of the invention, which shall be limited only by the scope of the appended claims.

What is claimed is:

1. The method of closing an open ended thermoplastic body with a relatively thin flexible thermoplastic sheet material comprising the steps:
    providing the end surface defining the open end of said body with a groove;
    disposing said sheet material to cover said open end and over said groove;
    providing a horn adapted to be resonant as a half wavelength resonator at a predetermined ultrasonic frequency between an input surface and an oppositely disposed output surface, said output surface including a protrusion dimensioned for entering said groove and with said sheet material disposed between said output surface and said body causing said protrusion to urge said sheet material into contact with surfaces forming said groove while said horn is rendered resonant for a predetermined time interval,
    whereby to effect said sheet material to be welded to said body in said groove for closing the open end of said body.

2. The method of closing an open ended thermoplastic body as set forth in claim 1, said body being a tubular body.

3. The method of closing an open ended thermoplastic body as set forth in claim 1, said body being a tubular body with circular cross-section.

4. The method of closing an open ended thermoplastic body as set forth in claim 3, said groove being of annular shape.

5. The method of closing an open ended thermoplastic body as set forth in claim 1, said groove being shaped to have side wall surfaces and a bottom surface and said protrusion being dimensioned to cause said film material to be in contact with the side wall surfaces of said groove.

6. The method of closing an open ended thermoplastic body as set forth in claim 1, said groove being shaped to have side wall surfaces and a bottom surface and said protrusion being dimensioned to cause said film material to be in contact with the side wall surfaces and the bottom surface of said groove.

7. The method of closing an open ended thermoplastic body as set forth in claim 1, said groove being of substantially "U"-shaped cross-section.

8. The method of closing an open ended thermoplastic body as set forth in claim 1, and trimming the sheet material extending beyond the outer contours of the body.

9. The method of closing an open ended thermoplastic body with a relatively thin flexible thermoplastic sheet material comprising the steps:
    providing the end surface defining the open end of said body said a groove;
    disposing said sheet material to cover said open end and over said groove;
    providing a horn adapted to be resonant as a half wavelength resonator for ultrasonic energy of predetermined frequency travelling therethrough from an input surface to an oppositely disposed output surface, said output surface including a protrusion dimensioned for entering said groove and with said sheet material disposed between said protrusion and said end surface causing said protrusion to urge said sheet material into contact with surfaces forming said groove;
    providing relative motion between said body and said horn for causing said protrusion to enter said groove and causing said sheet material to be urged into contact with the surfaces forming said groove, and
    maintaining engagement between said protrusion of said horn and said groove of said body for a time interval during which said horn is first rendered resonant to cause softening and flowing of thermoplastic material and then when said horn is rendered inactive for causing the softened material to rigidify and form a weld between said sheet material and body, such weld being substantially confined to said groove.

* * * * *